US010389972B2

(12) United States Patent
Kato

(10) Patent No.: US 10,389,972 B2
(45) Date of Patent: Aug. 20, 2019

(54) VIDEO SIGNAL TRANSMISSION DEVICE

(71) Applicant: HITACHI KOKUSAI ELECTRIC INC., Tokyo (JP)

(72) Inventor: Akihiro Kato, Tokyo (JP)

(73) Assignee: HITACHI KOKUSAI ELECTRIC INC., Tokyo (JP)

(*) Notice: Subject to any disclaimer, the term of this patent is extended or adjusted under 35 U.S.C. 154(b) by 0 days.

(21) Appl. No.: 16/072,380

(22) PCT Filed: Feb. 7, 2017

(86) PCT No.: PCT/JP2017/004382
§ 371 (c)(1),
(2) Date: Jul. 24, 2018

(87) PCT Pub. No.: WO2017/138520
PCT Pub. Date: Aug. 17, 2017

(65) Prior Publication Data
US 2019/0037167 A1  Jan. 31, 2019

(30) Foreign Application Priority Data

Feb. 10, 2016 (JP) .................................. 2016-023626

(51) Int. Cl.
H04N 7/08 (2006.01)
H04N 19/115 (2014.01)
(Continued)

(52) U.S. Cl.
CPC ............ H04N 7/0806 (2013.01); H04N 5/04 (2013.01); H04N 5/265 (2013.01); H04N 5/278 (2013.01);
(Continued)

(58) Field of Classification Search
CPC .. H04N 7/0806; H04N 19/115; H04N 19/146; H04N 19/172; H04N 5/04; H04N 5/265
See application file for complete search history.

(56) References Cited

U.S. PATENT DOCUMENTS 5,317,413 A * 5/1994 Yanagihara ............ H04N 5/917
348/607
5,821,995 A * 10/1998 Nisikawa ........... H04N 5/23203
348/211.5
(Continued)

FOREIGN PATENT DOCUMENTS

JP  2004-153334 A  5/2004
JP  2009-100412 A  5/2009
(Continued)

OTHER PUBLICATIONS

International Search Report dated Apr. 25, 2017.

Primary Examiner — Antoinette T Spinks
(74) Attorney, Agent, or Firm — Bacon & Thomas, PLLC

(57) ABSTRACT

In a video signal transmission device, a camera control device includes: a compression unit for compressing a return video signal; a compression/expansion unit for compressing/expanding a prompter video signal; a frame synthesis unit for synthesizing the video signals; an encoding unit for encoding the synthesized video signal; and a modulation unit for modulating the encoded video signal and transmitting the modulated video signal to the camera adaptor. A camera adaptor includes: a demodulation unit for demodulating the video signal from the camera control device; a decoder unit for decoding the demodulated video signal; an expansion unit for separating one video signal from the decoded video signal, expanding the video signal, and restoring the video signal to the return video signal; and an expansion/compression unit for separating one video signal from the decoded video signal, compressing/expanding the (Continued)

video signal, and restoring the video signal to the prompter video signal.

1 Claim, 3 Drawing Sheets

(51) Int. Cl.
*H04N 19/146* (2014.01)
*H04N 19/172* (2014.01)
*H04N 5/04* (2006.01)
*H04N 5/265* (2006.01)
*H04N 5/278* (2006.01)

(52) U.S. Cl.
CPC ......... *H04N 19/115* (2014.11); *H04N 19/146* (2014.11); *H04N 19/172* (2014.11)

(56) References Cited

U.S. PATENT DOCUMENTS

| | | | | |
|---|---|---|---|---|
| 6,226,447 | B1* | 5/2001 | Sasaki | H04H 20/74 386/230 |
| 6,674,796 | B1* | 1/2004 | Haskell | H04N 21/23418 348/385.1 |
| 2001/0055473 | A1* | 12/2001 | Tauchi | G11B 5/0086 386/208 |
| 2004/0172570 | A1* | 9/2004 | Miyajiri | G11B 20/1403 713/400 |
| 2005/0151838 | A1* | 7/2005 | Fujita | G06T 1/00 348/39 |
| 2006/0117360 | A1* | 6/2006 | Cooper | H04N 7/17318 725/100 |
| 2006/0126717 | A1* | 6/2006 | Boyce | H04L 1/02 375/240.01 |
| 2008/0013846 | A1* | 1/2008 | Fukuhara | G06F 17/148 382/240 |
| 2008/0181300 | A1* | 7/2008 | Hosaka | H04N 19/176 375/240.03 |
| 2008/0181522 | A1* | 7/2008 | Hosaka | H04N 19/63 382/251 |
| 2008/0304574 | A1* | 12/2008 | Fukuhara | H04N 5/232 375/240.29 |
| 2009/0074052 | A1* | 3/2009 | Fukuhara | H04N 19/63 375/240.01 |
| 2009/0092326 | A1* | 4/2009 | Fukuhara | H04N 19/139 382/233 |
| 2009/0102686 | A1* | 4/2009 | Fukuhara | H04N 19/647 341/67 |
| 2009/0102974 | A1 | 4/2009 | Ishimura | |
| 2010/0166053 | A1* | 7/2010 | Fukuhara | H04N 19/46 375/240.01 |

FOREIGN PATENT DOCUMENTS

| | | |
|---|---|---|
| JP | 2010-135882 A | 6/2010 |
| JP | 2012-134760 A | 7/2012 |

* cited by examiner

VIDEO SIGNAL TRANSMISSION DEVICE

FIELD OF THE INVENTION

The present invention relates to a video signal transmission device.

BACKGROUND OF THE INVENTION

In the case of using a digital triax system for transmission of video signals in a studio of a television station or the like, a high-definition video (HD return video) of another camera on the air or a standard-definition video (SD prompter video) for announcer script may be inputted to a camera control device, transmitted to a camera adaptor through a triax cable, and outputted to a view finder of the camera and a script projection device.

Unlike an optical fiber cable, the triax cable does not have a signal transmission band that allows uncompressed transmission of high-definition video. Thus, conventionally, the return video and the prompter video are compressed at a low bit rate by using a codec (image compression/decompression device) and then transmitted.

As for an example of a conventional technique Japanese Patent Application Publication No. 2010-135882 discloses a technique of minimizing transmission loss and transmission delay by defining a data transmission region where a compressed return video and a compressed prompter video are combined and varying the size of each transmission region in response to increase/decrease in the compressed prompter video data and the compressed return video data.

SUMMARY

In view of the above, the present invention provides a technique of efficiently transmitting two video signals.

In accordance with an aspect of the present invention, there is provide a video signal transmission device for transmitting a video signal using a camera control device and a camera adaptor. The camera control device includes: a compression unit configured to compress a return video signal at a predetermined compression rate; a horizontal compression/vertical expansion it configured to compress or expand a prompter video signal at a predetermined compression or expansion rate; a frame synthesis unit configured to synthesize the video signals outputted from the compression unit and the horizontal compression/vertical expansion unit into one video signal; an HD encoding unit configured to encode the video signal outputted from the frame synthesis unit; and a digital modulation unit configured to modulate the video signal outputted from the HD encoding unit and transmit the modulated video signal to the camera adaptor. The camera adaptor includes: a digital demodulation unit configured to demodulate the video signal transmitted from the camera control device; an HD decoder unit configured to decode the video signal outputted from the digital demodulation unit; a horizontal expansion unit configured to separate one video signal from the video signal outputted from the HD decoder unit, expand the video signal at a predetermined expansion rate, and restore the video signal to the return video signal; and a horizontal expansion/vertical compression unit configured to separate one video signal from the video signal outputted from the HD decoder unit, compress or expand the video signal at a predetermined compression or expansion rate, and restore the video signal to the prompter video signal.

In accordance with another aspect of the present invention, there is provide a video signal transmission device for transmitting a video signal using a camera control device and a camera adaptor, wherein the camera control device converts two video signals at a predetermined compression rate or expansion rate, synthesizes the two video signals into one video signal, and transmits the video signal to the camera adaptor.

Further, the two video signals may be a return video signal and a prompter video signal.

In accordance with the present invention, two video signals can be efficiently transmitted.

DETAIL DESCRIPTION OF THE EMBODIMENTS

Hereinafter, embodiments will be described in detail with reference to the accompanying drawings.

Figure 1:
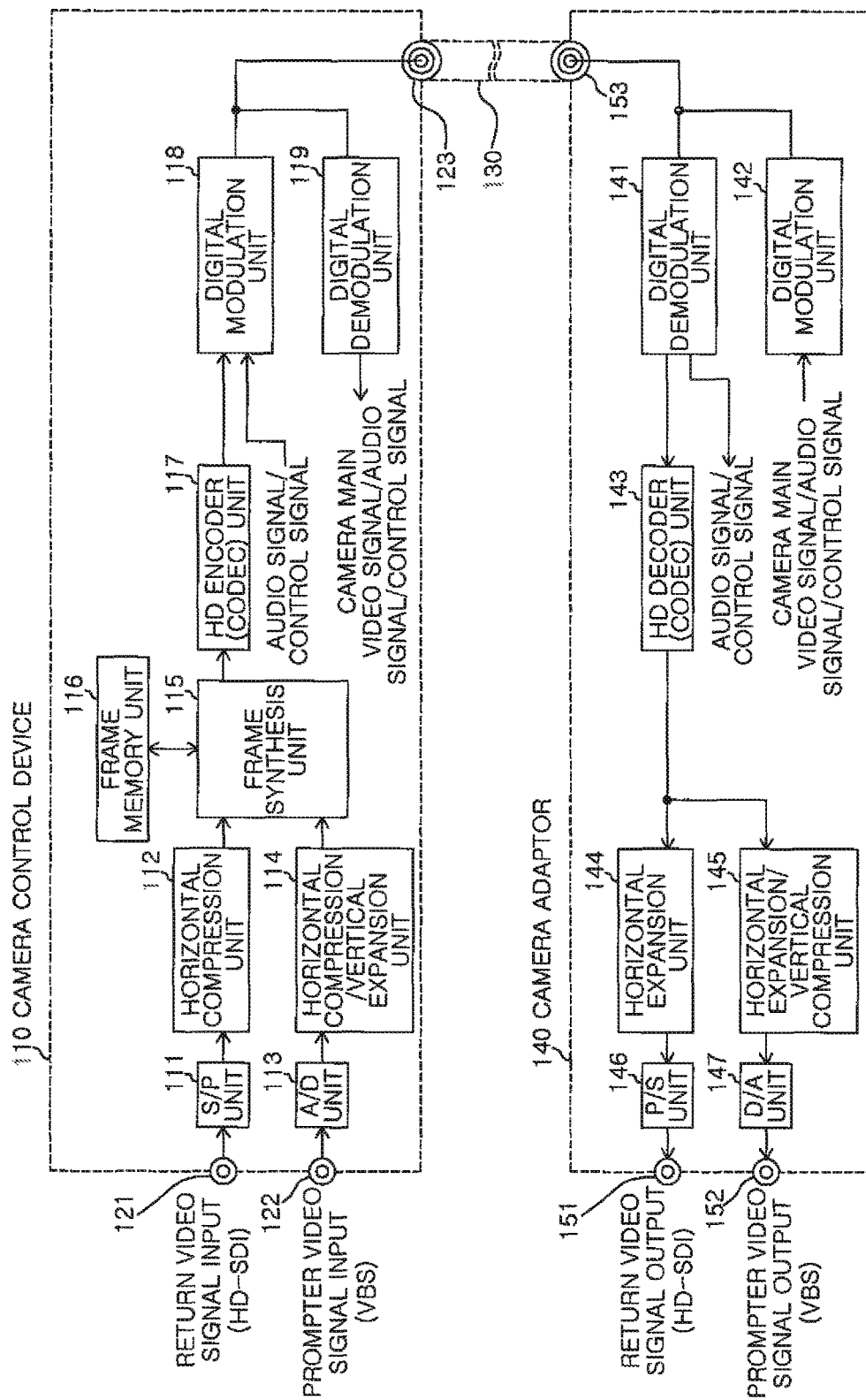
FIG. 1 is a block diagram of a video signal transmission device according to an embodiment.

FIG. 1 is a block diagram of a video signal transmission device according to an embodiment of the present invention. In FIG. 1, a video signal transmission device that is a digital triax system includes a camera control device 110, a camera adaptor 140, and a cable 130.

The cable 130 is a triax cable or the like, and transmits a video signal or the like.

The camera control device 110 includes an S/P (serial-parallel conversion) unit 111, a horizontal compression unit 112, an A/D (analog-digital conversion) unit 113, a horizontal compression/vertical expansion unit 114, a frame synthesis unit 115, a frame memory unit 116, an HD (High Definition) encoder unit 117, a digital modulation unit 118, a digital demodulation unit 119, and connectors 121 to 123.

The camera adaptor 140 includes a digital demodulation unit 141, a digital modulation unit 142, an HD decoder unit 143, a horizontal expansion unit 144, a horizontal expansion/vertical compression unit 145, a P/S (parallel-serial conversion) unit 146, a D/A (digital-analog conversion) unit 147, and connectors 151 to 153.

Next, the operation of the camera control device will be described with reference to FIGS. 1 and 2.

Figure 2:
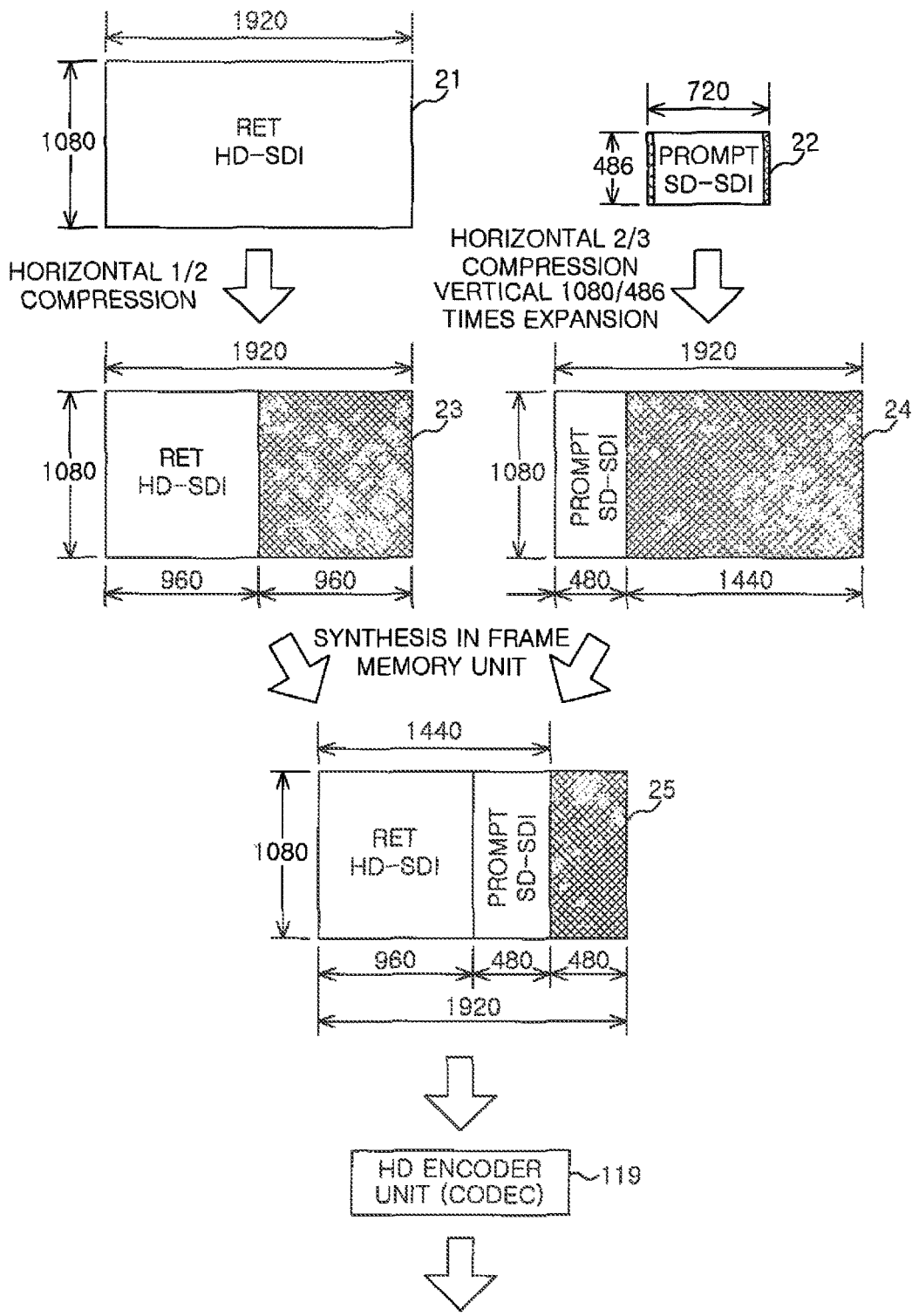
FIG. 2 explains synthesis of two video signals by a camera control device according to an embodiment.

FIG. 2 explains synthesis of two video signals by a camera control device according to an embodiment of the present invention.

Two video signals are, e.g., a return video signal (RET HD-SDI: Return High Definition-Serial Digital Interface) and a prompter video signal (VBS: Video (video signal) Burst (color burst signal) Sync (Synchronization signal)).

The return video signal (HD-SDI) inputted to the camera control device 110 shown in FIG. 1 is converted into a parallel signal by the S/P unit 111 and becomes an HD video signal of 1920 horizontal pixels×1080 vertical pixels.

On the other hand, the prompter video signal (VBS) inputted to the camera control device 110 is converted into a digital video signal by the A/D unit 113 and becomes an SD (Standard Definition) video signal of 720 horizontal pixels×486 vertical pixels.

The number of horizontal pixels of the return video signal (RET HD-SDI) converted into the parallel signal by the S/P unit 111 is compressed to ½ by the horizontal compression unit 112. Accordingly, a video signal of 960 horizontal effective pixels×1080 vertical pixels which is indicated by 23 in FIG. 2, is obtained. Here, while the actual number of horizontal pixels is maintained at 1920 pixels, 960 pixels on the right side are filled with black level dummy video signals to make the subsequent synthesis process in the frame memory unit 116 easier.

On the other hand, the number of horizontal pixels of the prompter video signal (PROMPT SD-SDI) converted into the digital video signal by the A/D unit 113 is compressed to ⅔ and the number of vertical pixels is expanded 1080/486 times by the horizontal compression/vertical expansion unit 114. Accordingly, the prompter video signal is converted into a video signal of 480 horizontal pixels×1080 vertical pixels, which is indicated by 24 in FIG. 2. In this case as well, 1440 pixels on the right side are filled with black level dummy video signals to make the subsequent synthesis process in the frame memory unit 116 easier.

The return video signal (RET HD-SDI) compressed by the horizontal compression unit 112 and the prompter video signal (PROMPT SD-SDI) compressed and expanded by the horizontal compression vertical expansion unit 114 are synthesized into one frame video signal by the frame synthesis unit 115 and become a synthesis video signal including the return video on the left side and the prompter video on the right side, which is indicated by 25 in FIG. 2. Here, the number of horizontal effective pixels after synthesis is set to 1440 because the specification of the HD codec used in the present embodiment is 1440 horizontal pixels×1080 vertical pixels. 480 pixels on the right side that do not satisfy 1920 horizontal pixels of the original high definition standard are filled with black level dummy video signals.

Since the return video signal (HD-SDI) and the prompter video signal (VBS) are inputted from an external system, they may not be synchronized with the video signal of the camera. In other words, most of the horizontal and vertical phases of the video signals may not be synchronized. Therefore, in the frame synthesis unit 115, each video signal data is stored in the frame memory unit 116 at the phase timing of each video signal, and the video signal data after frame synthesis is read out at the timing synchronized with the video of the camera. Accordingly, a synchronization process, in which separate frame memories are conventionally required for the return video signal (HD-SDI) and the prompter video signal (VBS), can be performed by a single frame memory. As a result, the number of components can be reduced.

The video signal that is frame-synthesized by the frame synthesis unit 115 is encoded at a low bit rate by the HD encoder unit 117 and converted into a digital serial signal by the digital modulation unit 118 by multiplexing an audio signal from an external system and a control signal of the camera. Then, the digital serial signal is transmitted to the camera adaptor 140 through the cable 130.

Meanwhile, a camera main video signal, a microphone audio signal, a camera control signal and the like re transmitted as serial digital signals from the camera adaptor 149 through the cable 130. The digital demodulation unit 119 demodulates those signals.

Next, the operation of the camera adaptor will be described with reference to FIGS. 1 and 3.

Figure 3:
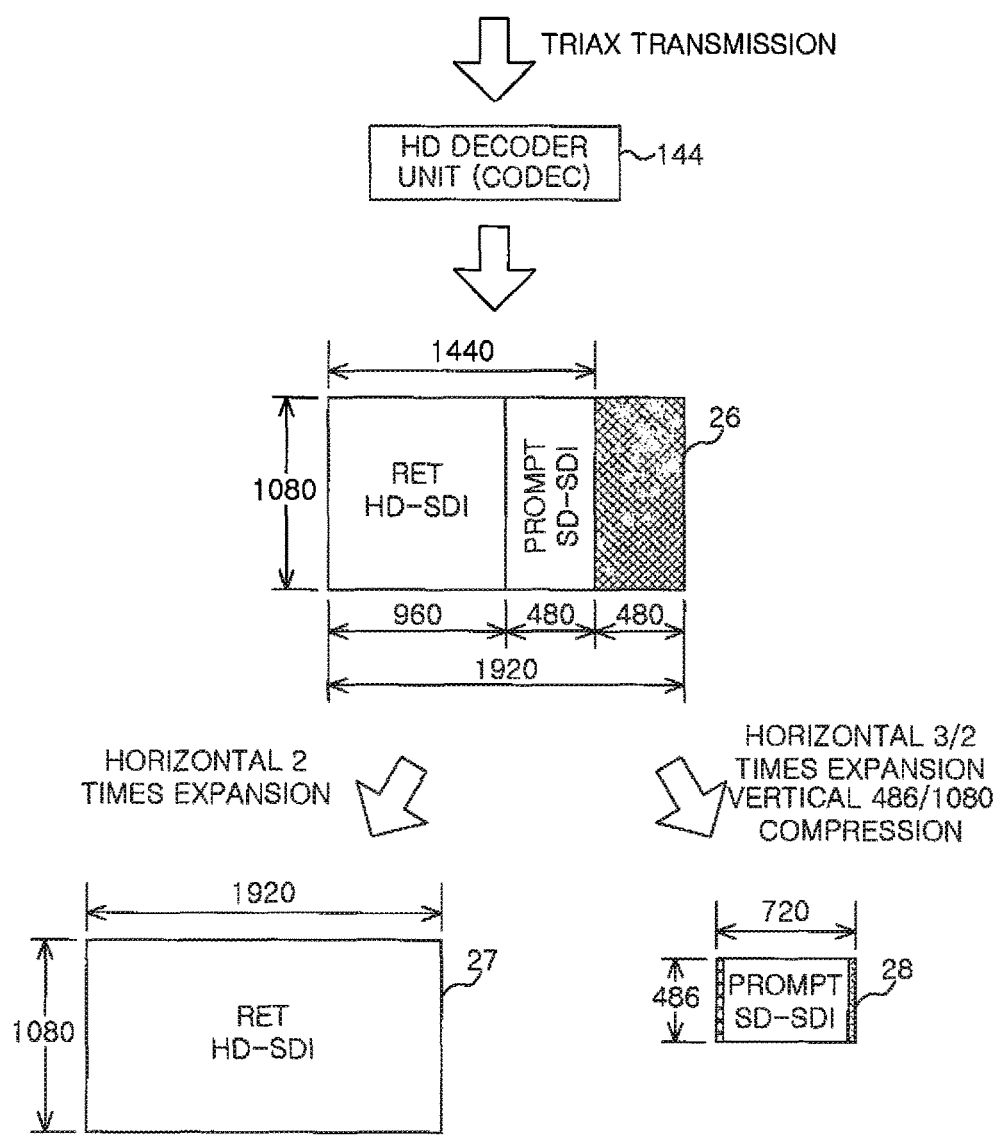
FIG. 3 explains an operation in which a camera adaptor according to an embodiment divides one video signal into two video signals.

FIG. 3 explains the operation in which the camera adaptor according to the embodiment of the present invention divides one video signal into two video signals. Referring to FIG. 1, in the camera adaptor 140, a signal transmitted from the camera control device 110 is demodulated by the digital demodulation unit 141 and, then, the audio signal and the control signal are separated. Only a synthesis video signal of the return video and the prompter video is outputted to the HD decoder unit 143 and decoded into a synthesis video signal with a normal bit rate by the HD decoder unit 143.

On the other hand, the camera main video signal, the microphone audio signal, the camera control signal and the like are modulated by the digital modulation unit 142 and then transmitted to the camera control device 110.

The return video signal (RET HD-SDI) in the synthesis video signal after the decoding, which is indicated by 26 in FIG. 3, is expanded twice in the horizontal direction by the horizontal expansion unit 144 and restored to the original return video signal (HD) of 1902 horizontal pixels×1080 vertical pixels which is indicated by 27 in FIG. 3.

The prompter video signal (PROMPT SD-SDI) in the synthesis video signal after the decoding, which is indicated by 26 in FIG. 3, is expanded 1.5 times in the horizontal direction by the horizontal expansion/vertical compression unit 145 and compressed 486/1080 times in the vertical direction, and restored to the original prompter video signal (SD) of 720 horizontal pixels×486 vertical pixels, which is indicated by 28 in FIG. 3.

Finally, the return video signal (HD) converted into a return video signal (HD-SDI) by the P/S unit 146 and outputted to a camera (not shown).

The prompter image signal (SD) is converted into a prompter video signal (VBS) by the D/A unit 147 and outputted to an external script projection device or the like (not shown).

The video signal transmission device according to the embodiment of the present invention can efficiently transmit two video signals.

While the embodiment of the present invention has been described in detail, the present invention is not limited to the above-described embodiment, and various modifications may be made without departing from the spirit of the present invention. This application claims priority to Japanese Patent Application No. 2016-23626 filed on Feb. 10, 2016, the entire contents of which are incorporated herein by reference.

INDUSTRIAL APPLICABILITY

The present invention can be applied to the case of efficiently transmitting video signals by compressing or expanding two video signals and synthesizing the two video signals into one signal.

DESCRIPTION OF REFERENCE NUMERALS

| | |
|---|---|
| 110: camera control device | 111: S/P unit |
| 112: horizontal compression unit | 113: A/D unit |
| 114: horizontal compression/vertical expansion unit | |
| 115: frame synthesis unit | 116: frame memory unit |
| 117: HD encoder (coding) unit | |
| 118: digital modulation unit | |
| 119: digital demodulation unit | 121, 122, 123: connector |
| 130 cable | 140: camera adaptor |
| 141: digital demodulation unit | |
| 142: digital modulation unit | |
| 143: HD decoder (coding) unit | |
| 144: horizontal expansion unit | |
| 145: horizontal expansion/vertical compression unit | |

-continued

| | |
|---|---|
| 146: P/S unit | 147: D/A unit |
| 151, 152, 153: connector | |

What is claimed is:

1. A video signal transmission device for transmitting a video signal using a camera control device and a camera adaptor, wherein the camera control device includes:
   a compression unit configured to compress a return video signal at a predetermined compression rate;
   a horizontal compression/vertical expansion unit configured to compress or expand a prompter video signal at a predetermined compression or expansion rate;
   a frame synthesis unit configured to synthesize the video signals outputted from the compression unit and the horizontal compression/vertical expansion unit into one frame of video signal;
   an HD encoding unit configured to encode said one frame of video signal outputted from the frame synthesis unit; and
   a digital modulation unit configured to modulate the video signal outputted from the HD encoding unit and transmit the modulated video signal to the camera adaptor, and
wherein the camera adaptor includes:
   a digital demodulation unit configured to demodulate the video signal transmitted from the camera control device;
   an HD decoder unit configured to decode the video signal outputted from the digital demodulation unit;
   a horizontal expansion unit configured to separate one video signal from the video signal outputted from the HD decoder unit, expand the video signal at a predetermined expansion rate, and restore the video signal to the return video signal; and
   a horizontal expansion/vertical compression unit configured to separate one video signal from the video signal outputted from the HD decoder unit, compress or expand the video signal at a predetermined compression or expansion rate, and restore the video signal to the prompter video signal.

* * * * *